April 14, 1970  C. T. NYE  3,505,801
FRUIT HARVESTER

Filed March 12, 1968  10 Sheets-Sheet 1

INVENTOR.
CUYLER T. NYE.
BY
ATTORNEY

INVENTOR.
CUYLER T. NYE.

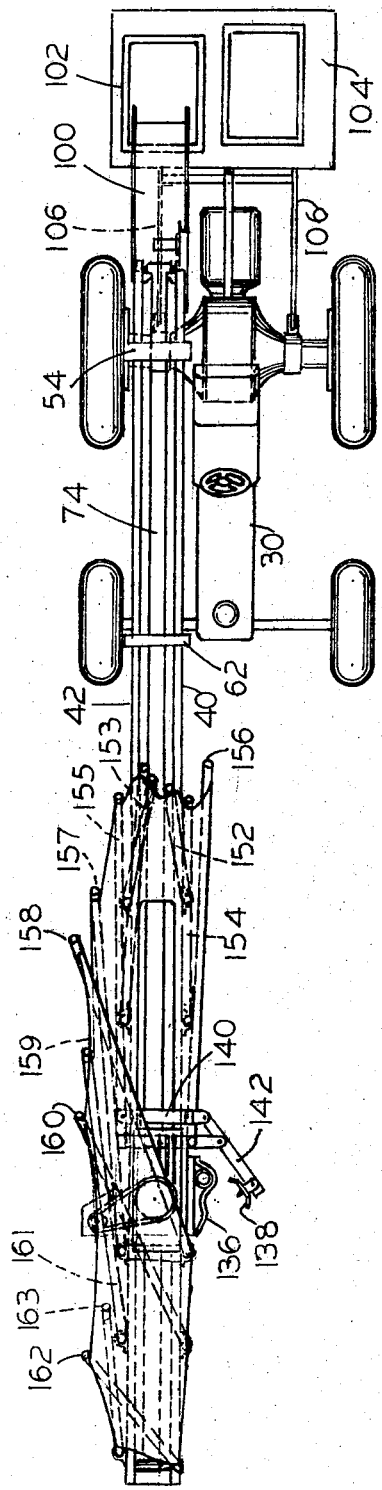

April 14, 1970 C. T. NYE 3,505,801
FRUIT HARVESTER
Filed March 12, 1968 10 Sheets-Sheet 4
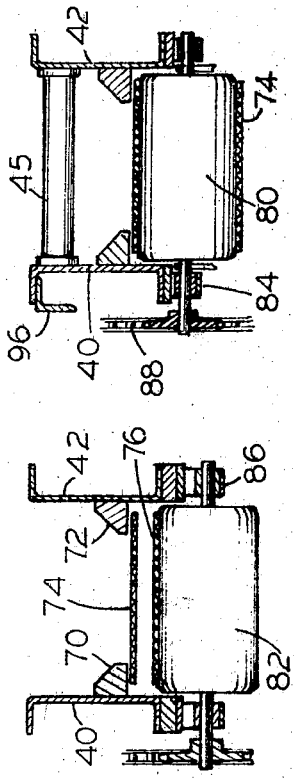
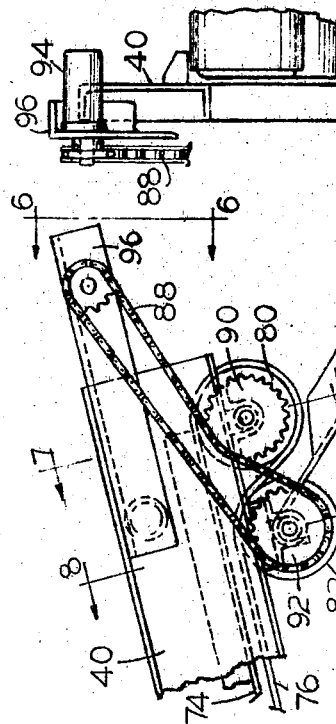
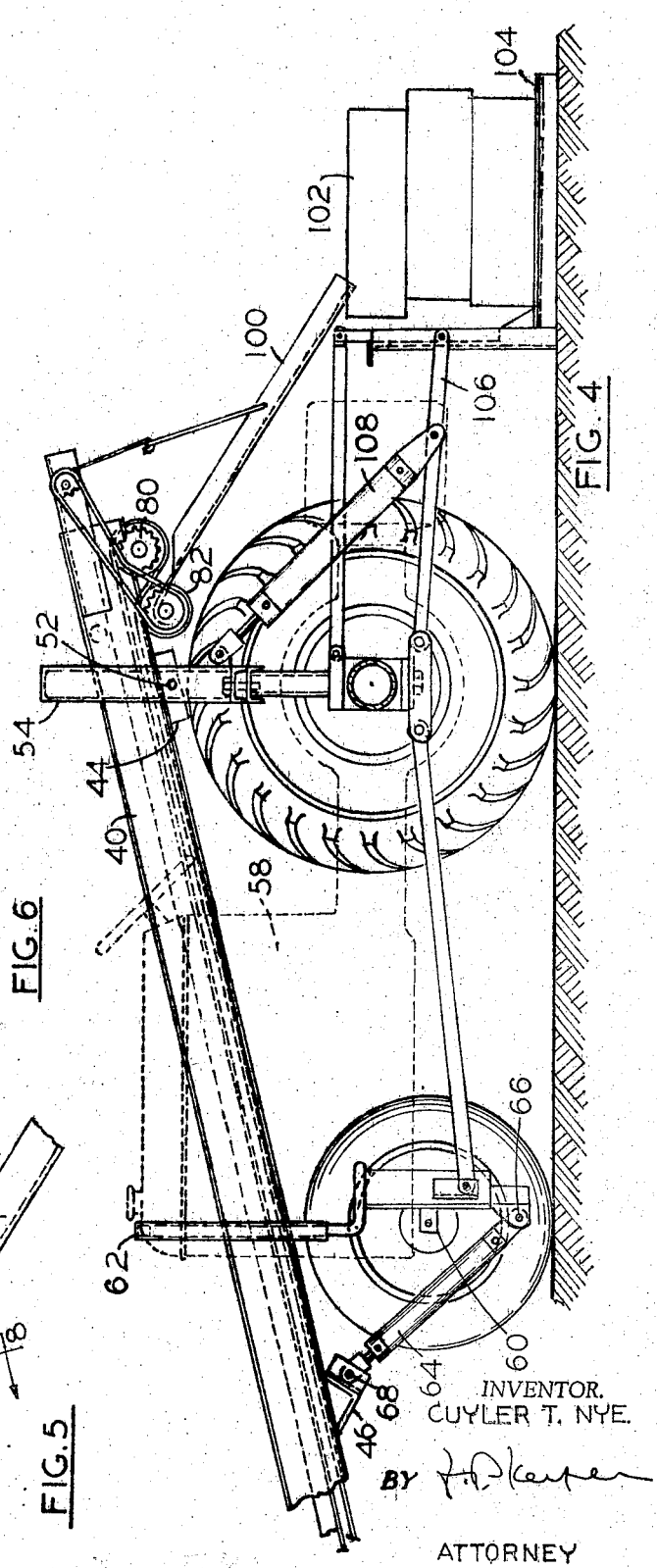
INVENTOR.
CUYLER T. NYE.
ATTORNEY April 14, 1970

C. T. NYE 3,505,801

FRUIT HARVESTER

Filed March 12, 1968

INVENTOR.
CUYLER T. NYE.

BY

ATTORNEY

April 14, 1970     C. T. NYE     3,505,801

FRUIT HARVESTER

Filed March 12, 1968     10 Sheets-Sheet 6

INVENTOR.
CUYLER T. NYE.

BY

ATTORNEY

April 14, 1970  C. T. NYE  3,505,801
FRUIT HARVESTER

Filed March 12, 1968  10 Sheets-Sheet 7

INVENTOR.
CUYLER T. NYE.
BY
ATTORNEY

April 14, 1970

C. T. NYE 3,505,801

FRUIT HARVESTER

Filed March 12, 1968

INVENTOR.
CUYLER T. NYE.

BY J. P. Kenper

ATTORNEY

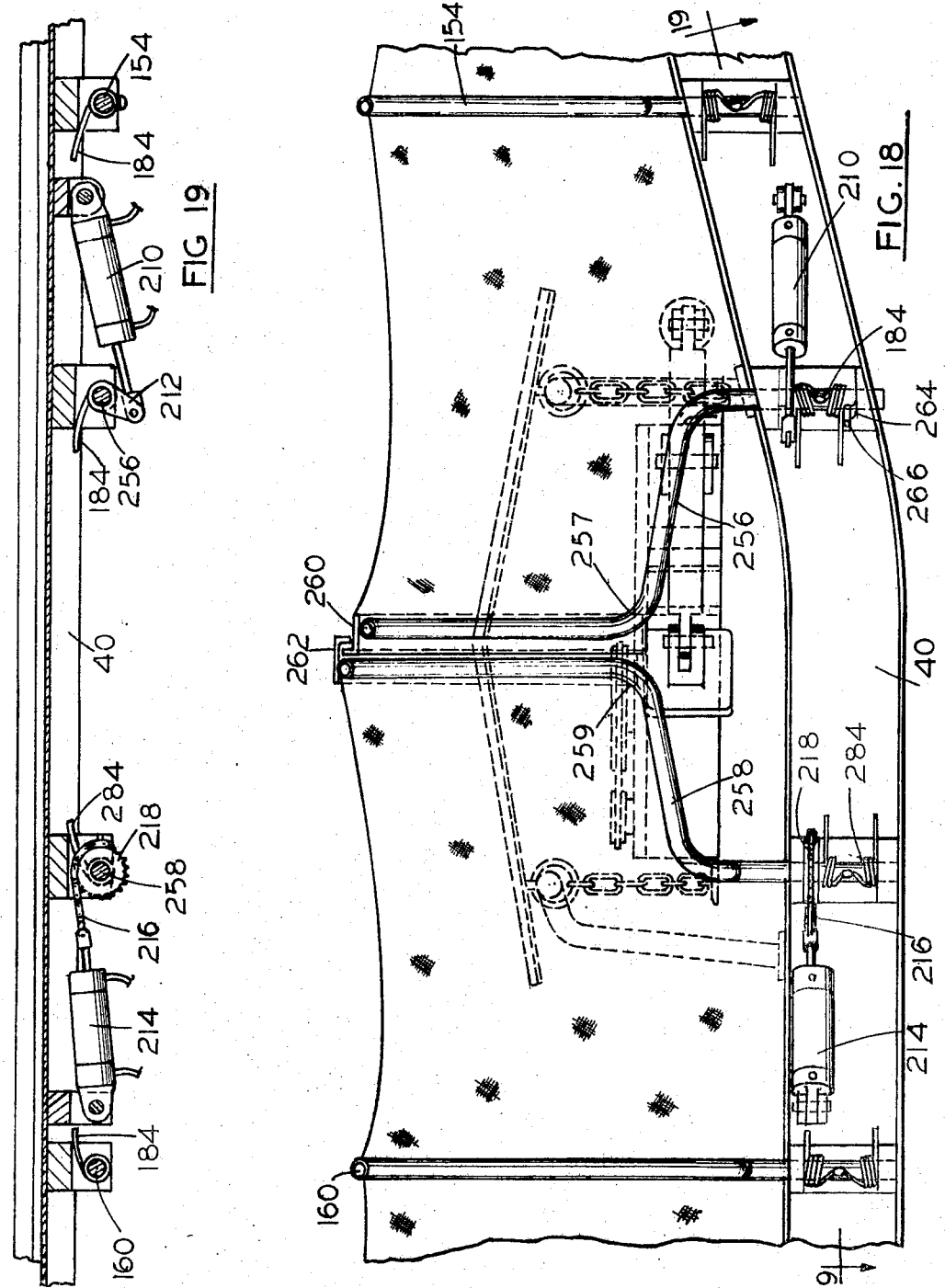

United States Patent Office 3,505,801
Patented Apr. 14, 1970

3,505,801
FRUIT HARVESTER
Cuyler T. Nye, R.D. 3, Lyons, N.Y. 14489
Filed Mar. 12, 1968, Ser. No. 712,417
Int. Cl. A01g *19/08*
U.S. Cl. 56—329                                10 Claims

ABSTRACT OF THE DISCLOSURE

Fruit tree harvesting apparatus comprising an elongated inclined boom including a conveyor adapted to be carried by a tractor at its upper end and reach to the trunk of a fruit tree at the other, and a vibratory tree shaker yieldingly mounted on the boom, and a solid clamp for the shaker to grip the trunk of a tree and bearing on opposite sides of the tree trunk and applying pressure to the opposite sides of the tree along a clamp axis, with the shaker being oriented to apply vibratory forces to the tree trunk at an accelerating frequency in the direction of the clamp axis, and a folding fruit catching canopy mounted on swinging supports pivoted on the conveyor boom.

---

This invention relates to harvesting and more particularly to harvesting from fruit trees, as for example cherry trees.

In the harvesting of cherries, for example, it is desirable to harvest the crop during a critical period of relatively short duration, when the crop has matured to the desired picking stage. Manual picking is slow, costly and tedious, and unless adequate labor is available can not usually be accomplished within the critical period. Once a crop reaches the critical period it is vulnerable to attack by birds, and windstorms may bruise the crop. It is desirable to harvest the crop, with all possible dispatch.

The present invention is directed to apparatus which may be transported about the fruit orchard, and which may be quickly moved from tree to tree and quickly harvest the crop of a particular tree. The apparatus more particularly comprises a tree trunk engaging vibratory apparatus adapted to vibrate the entire tree, and a readily extendable and foldable catching apron associated with belt conveyor to move the crop as fast as it may be loosened from the tree and deliver the crop to containers for transport to the market, or canning factory as the case may be.

The vibratory apparatus is preferably of the type shown in copending application No. 576,986 filed Sept. 2, 1966, and now Patent 3,392,517, and is carried on a conveyor, the frame work of which comprises a boom which may be carried about the orchard by mounting the conveyor boom upon a standard tractor. The conveyor frame work in addition provides support for an extendable and retractable fruit catching apron sufficiently large to encompass the area beneath a tree to catch gravitating fruit detached by vibratory action.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 3 is a plan view of the apparatus with the catch apron retracted;

FIGURE 4 is an enlarged showing of the mount of the conveyor boom on a tractor;

FIGURE 5 is an enlarged fragmentary side view of the conveyor drive;

FIGURE 6 is a fragmentary end view of the conveyor as seen from the plane 6—6 of FIGURE 5;

Figure 9:
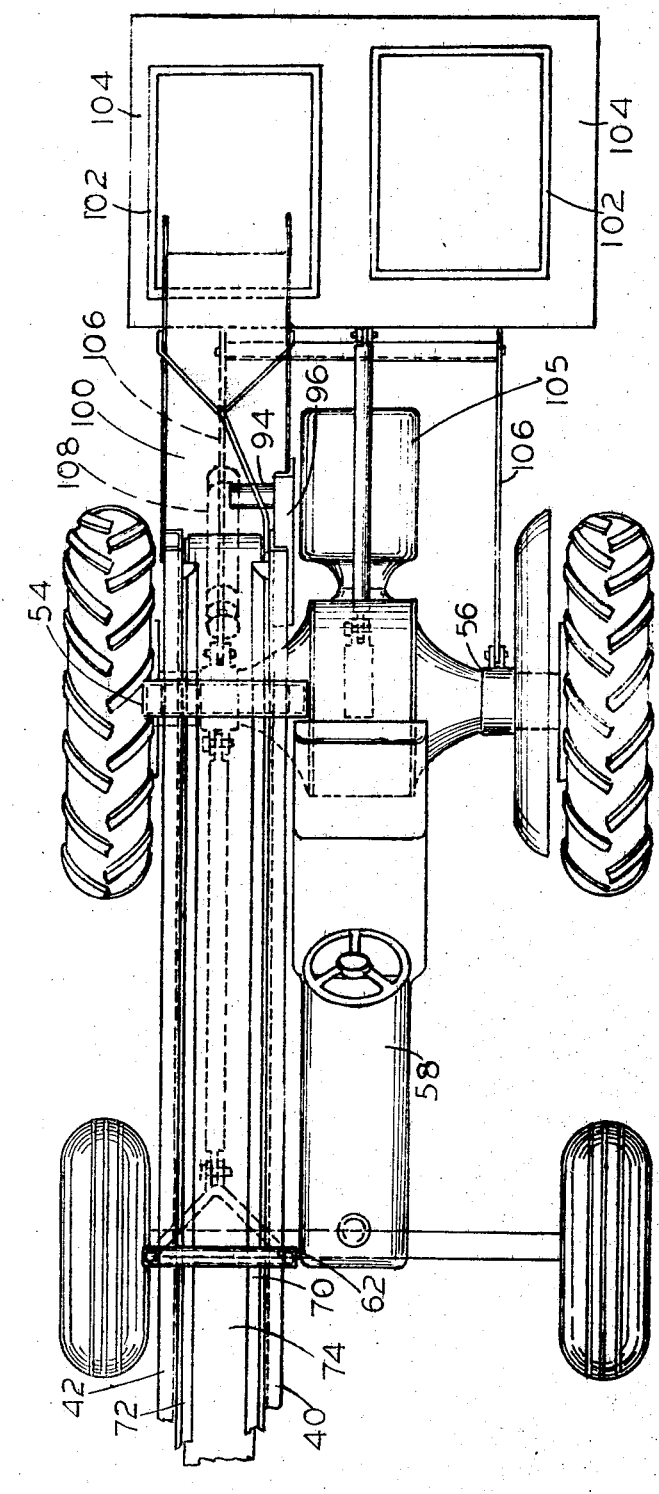
Figure 10:
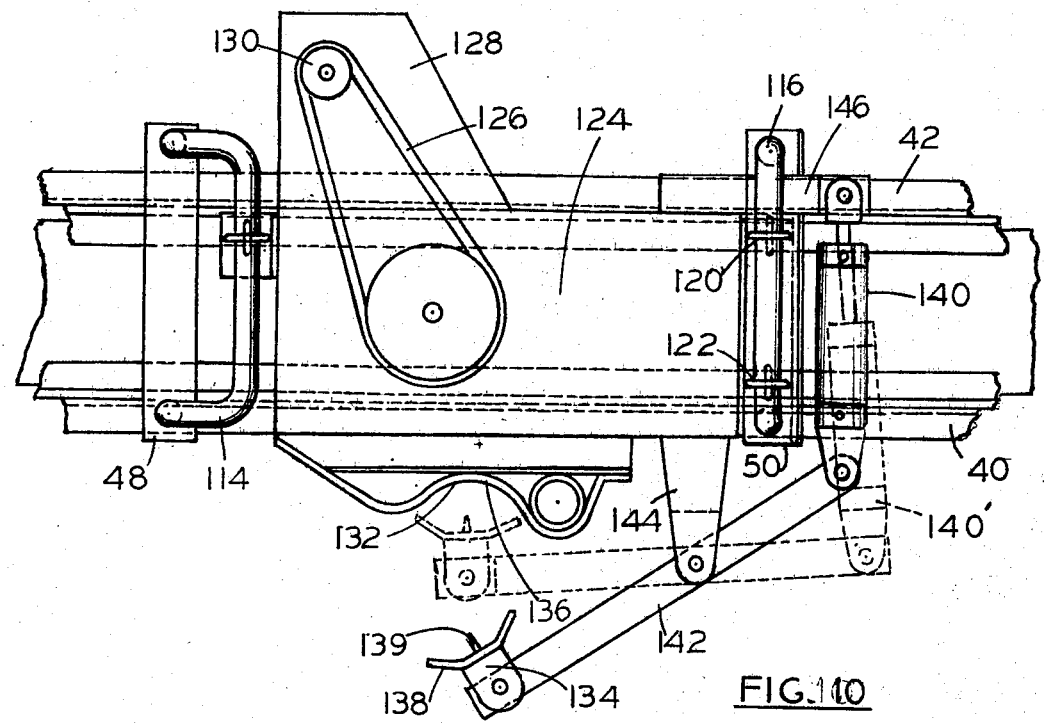
Figure 11:
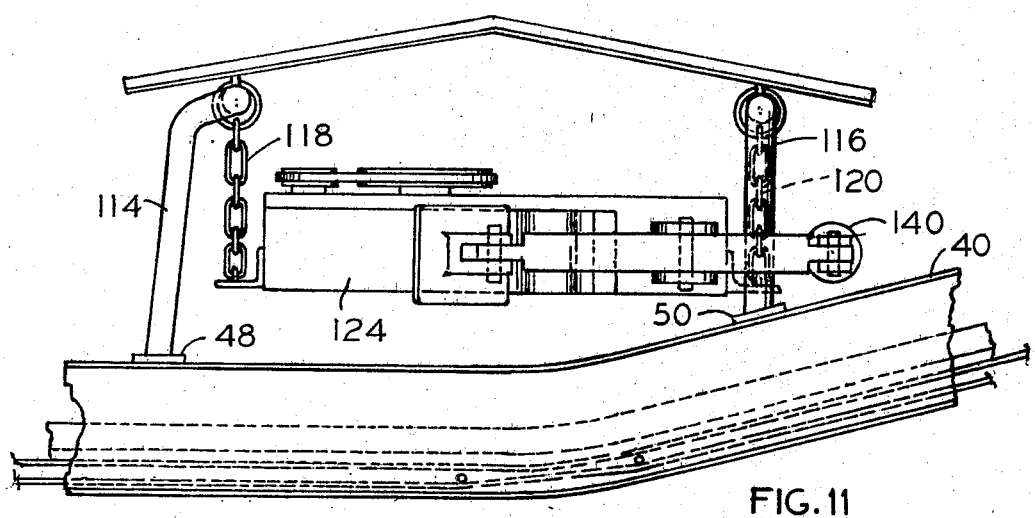
Figure 13:
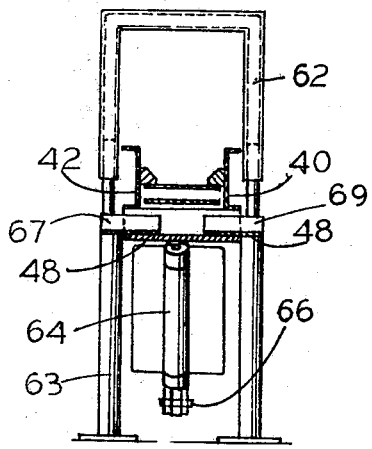
Figure 12:
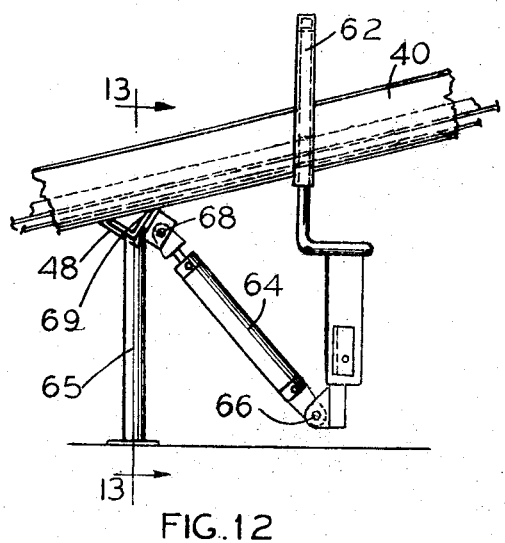
Figure 14:
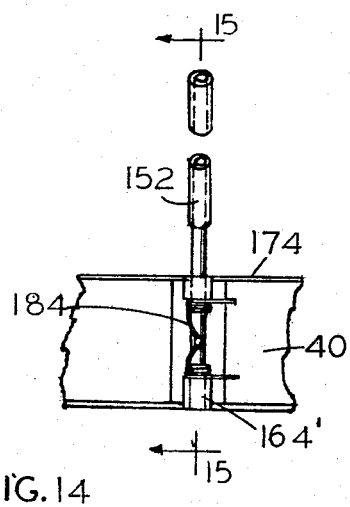
Figure 15:
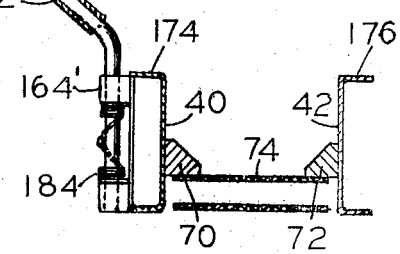
Figure 16:
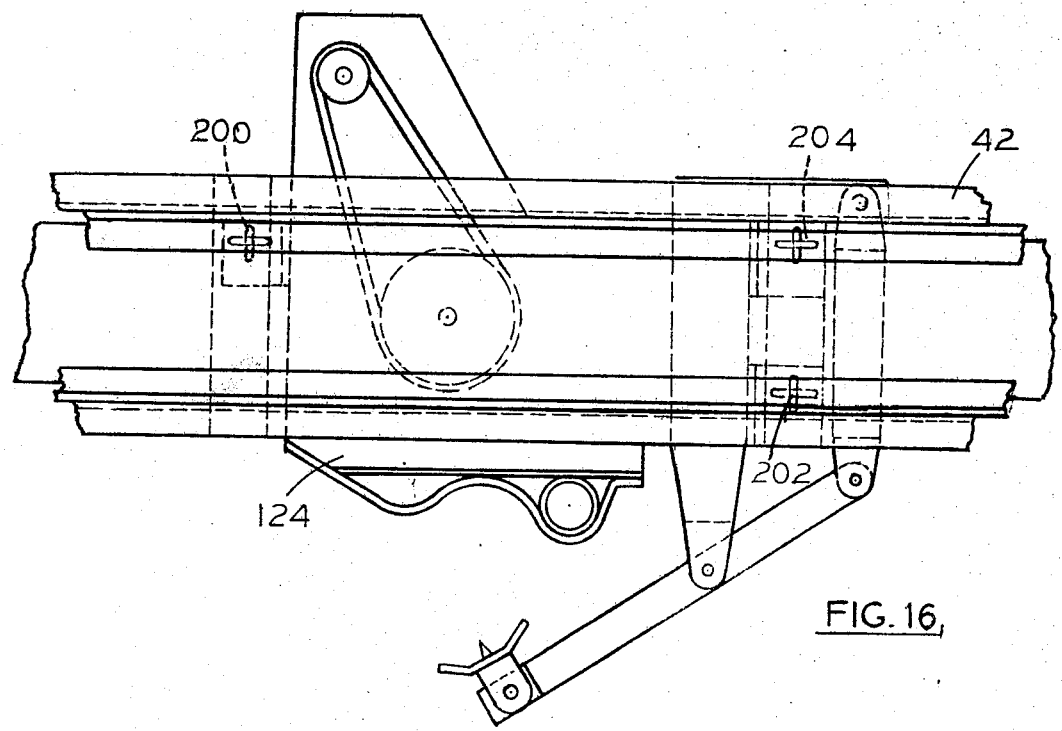
Figure 17:
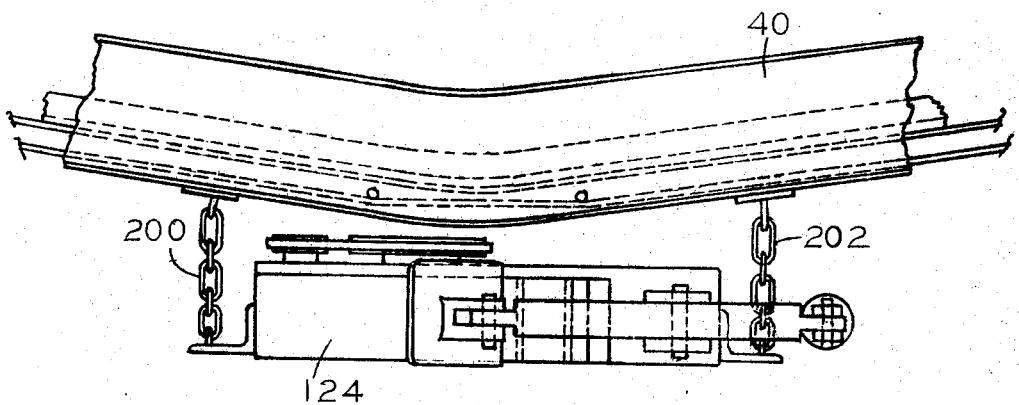
Figure 20:
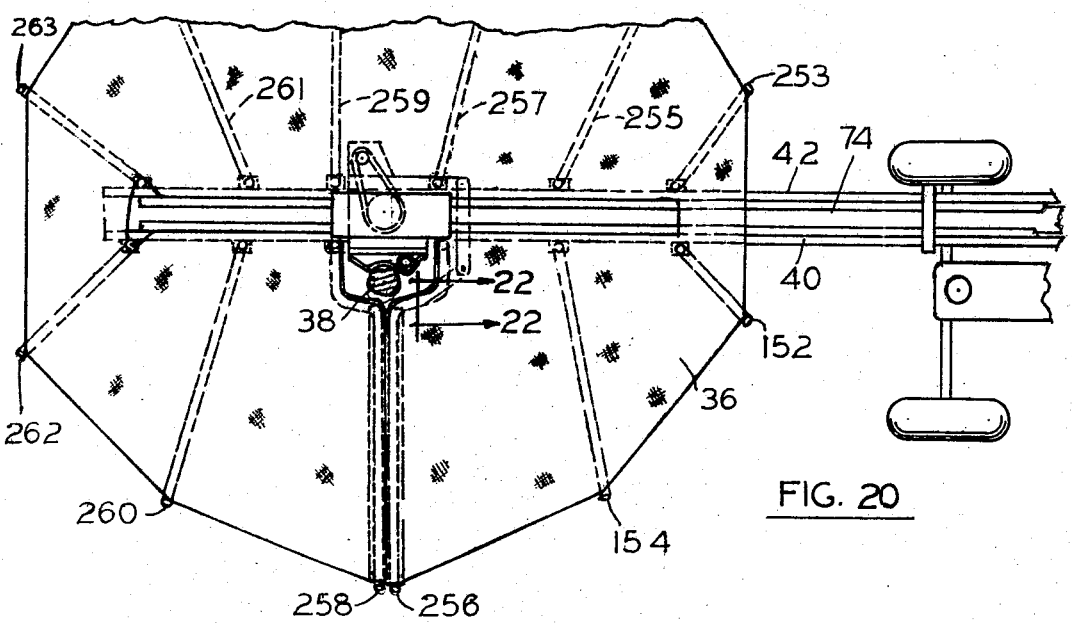
Figure 21:
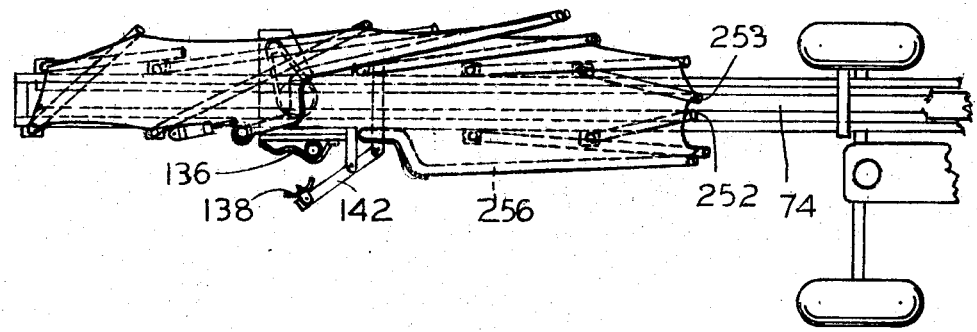
Figure 22:
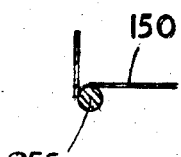

FIGURES 7 and 8 are sectional views taken on the lines 7—7 and 8—8 of FIGURE 5;

FIGURE 9 is an enlarged plan view of the tractor and the conveyor boom mounted thereon;

FIGURE 10 is a plan view of the shaker mechanism and its mount upon the conveyor boom;

FIGURE 11 is a side view of the shaker mechanism and its mount upon the conveyor boom;

FIGURE 12 is a fragmentary side view of the conveyor elevating mechanism, and a temporary support for use to support the apparatus when detached from the tractor;

FIGURE 13 is a sectional view taken on the line 13—13 of FIGURE 12;

FIGURE 14 is a fragmentary side view of an apron support arm;

FIGURE 15 is a sectional view taken on the line 15—15 of FIGURE 14;

FIGURES 16 and 17 are plan and side views of a shaker mounted below the conveyor boom;

FIGURE 18 is a fragmentary side view of a power actuated catch apron;

FIGURE 19 is a sectional view taken on the line 19—19 of FIGURE 18;

FIGURES 20 and 21 are plan views of the apron of FIGURE 18 in open and closed position respectively; and FIGURE 22 is a fragmentary sectional view, taken on the line 22—22 of FIGURE 20.

Figure 1:
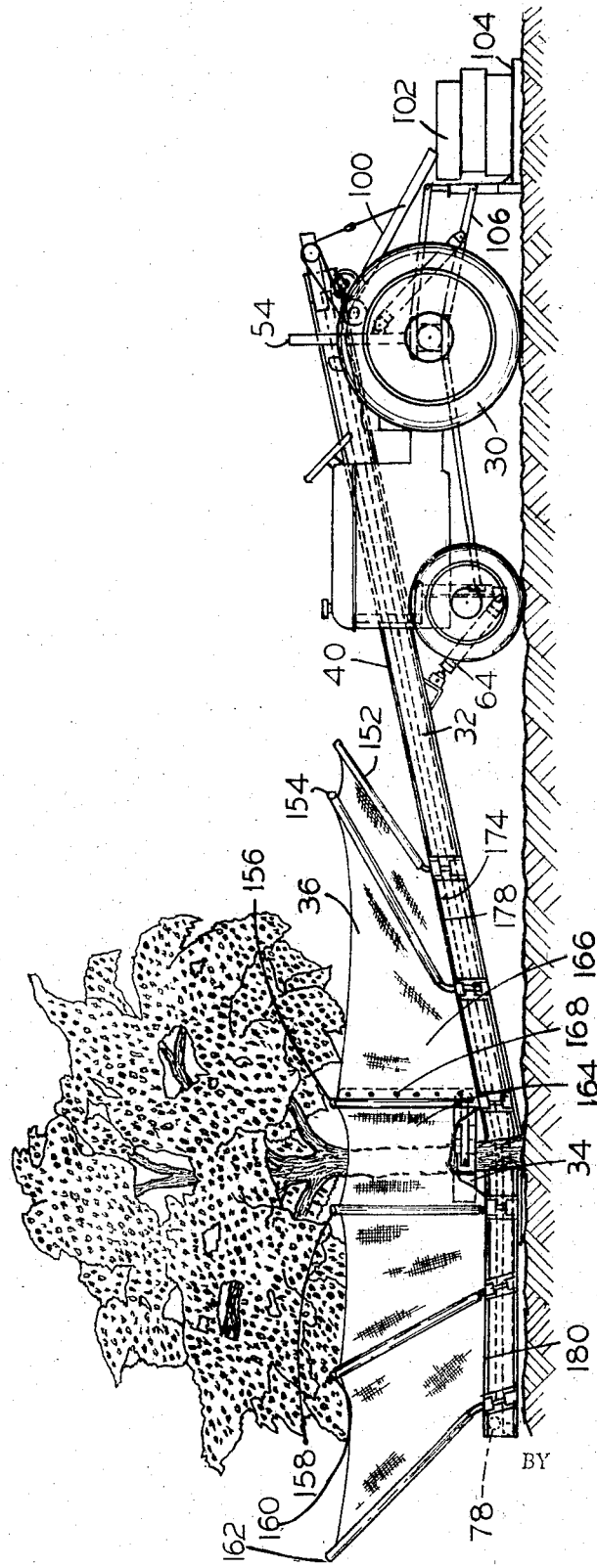
FIGURE 1 is a side elevational view of the harvesting apparatus disposed in harvesting relation to a fruit tree.
Figure 2:
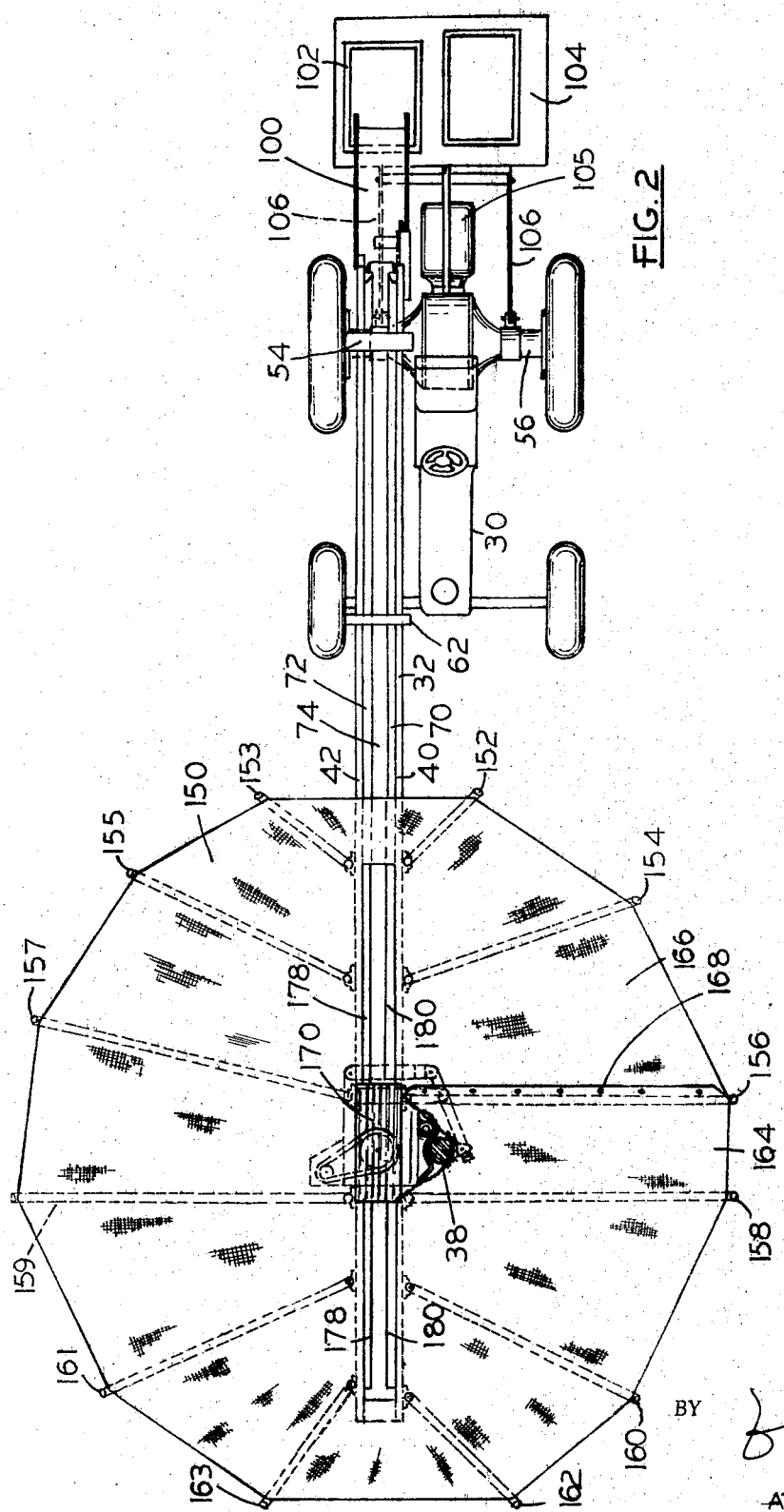
FIGURE 2 is a plan view of the apparatus, with the catch apron expanded.

In FIGURES 1 and 2 there is shown a tractor 30 upon which is mounted a boom like conveyor 32, that is adapted to extend forward of the tractor for effective use in connection with a tree. As shown the conveyor is provided with a conveyor supported shaker apparatus 34, and an apron like, or inverted canopy, 36, shown in open fruit catching position. As can be seen in FIGURE 2 the shaker 34 is shown coupled to the trunk 38 of the tree.

Referring to FIGURES 4-8 inclusive the conveyor comprises a pair of spaced elongated light weight channel members 40 and 42, which may be tied together at suitable points along their length, and as by the tube 45 in FIGURE 7, the mounting block 44, the angle iron 46 as in FIGURE 4 and straps 48 and 50 as appear in FIGURES 10 and 11. The upper end of the conveyor is pivotally mounted as at 52 in a frame 54 which is affixed to the tractor rear axle housing 56, to one side of the engine 58. Mounted on the front tractor axle 60, is a forward rectangular guide frame 62, and an elevating hydraulic cylinder 64 pivotally attached to the axle and the angle iron 46 as at 66 and 68 respectively.

Each of the channels 40 and 42 are provided with angular sectioned guide members 70 and 72 disposed above the upper reach 74 of a smooth rubberized fabric belt 76, which belt and members 70 and 72 extend from one end of the channel members to the other, the belt at the far end passing around a roller 78, and passing over a pair of drive rollers 80 and 82 at the upper end. The rollers are preferably closely spaced and journalled in bearing blocks such as 84 and 86 beneath the channels 40 and 42. The rollers 80 and 82 are driven so as to provide like peripheral velocities, which may be conveniently achieved by employing rolls of like diameter and a chain and sprocket drive 88 acting on sprockets 90 and 92 of like diameter and number of teeth in the manner indicated in FIGURE 5. The chain may be driven by a hydraulic motor 94 mounted on the arm 96. Through the use of the closely spaced rollers 80 and 82 and their drive in reverse directions, adequate frictional grip upon the conveyor belt is provided, whereby the entire length of the reach 74 may be loosely tensioned to run lightly between and beneath but substantially in continuous contact with the under faces of the guide members 70 and 72 such that fruit landing on the conveyor belt will be transported up the slight incline of the conveyor as appears in FIGURES 1 and 4, for example.

Beneath the upper end of the conveyor is a chute 100 adapted to direct fruit into a box such as 102 carried on a platform 104 that is elevatable by reason of substantially parallelogram linkage 106 pivotally connecting the platform and to the rear axle housing 56 of the tractor and a hydraulic cylinder 108 diagonally and pivotally connecting with the lower links of the linkage 56 and the conveyor frame 54.

As shown in FIGURES 10 and 11, the conveyor channels may be provided with a slight bend, as at 110, so that the portion thereof in the region adjacent the tree trunk and beyond may extend generally horizontal as at 112 and substantially in contact with the ground along its length, the channel members being allowed to rest on the ground during actual harvest operations at each tree. Mounted above the channel members 40 and 42 are bridging tubular supports 114 and 116 from which, as by a three point suspension through chains 118, 120 and 122, is flexibly hung a vibratory shaker assembly 124, which may preferably be of the inertia weight type as disclosed in the aforesaid application 576,986 filed Sept. 2, 1966 and application 370,731 filed May 27, 1964 and now abandoned. Such vibratory shaker may be driven as by a belt drive 126 from a hydraulic motor mounted below the extension 128, on the shaft of which is the pulley 130. The inertia weights within the shaker housing are set to provide vibratory forces crosswise of the conveyor and in line with the tree trunk gripping members 132 and 134, the member 132 being affixed rigidly to the side of the shaker and having an arcuate section 136 which may have light padding and be adapted to bear against the side of a tree trunk, as indicated at 38 in FIGURE 2. In order to rigidly attach the vibratory mechanism to the trunk of a tree, a hydraulically actuated lever having a clamp member 138 is provided, such clamp preferably including a small sharp pin 139 to pierce the tree bark and to assure that the clamp may not shift during its vibratory operation. The cylinder 140 actuates the lever 142 which is fulcrummed on a solid bracket 144 extending from the housing side. The cylinder 140 is pivotally mounted on a rigid bracket 146 extending from the other side of the housing 124. Since the cylinder is actuated by hydraulic liquid, the cylinder when extended as indicated at 140 in FIGURE 10 is capable of being locked into a rigid grip of a tree trunk in a manner to eliminate any relative movement between the tree trunk and clamp and vibratory apparatus.

In this manner, by a minimum amount of power, the rotation of the inertia weights may be accelerated rapidly to reach a frequency bearing resonance with the whole tree, at which point substantially all of the fruit is severed from its stems, or the stems severed from the twigs, and in a manner of seconds, the tree is stripped of its fruit.

In order to catch the fruit, the apron 36 is extended in the manner illustrated in FIGURES 1, 2, from a folded position as shown in FIGURE 3. For this purpose light weight flexible netting 150 suitably gored so as to provide a circular, slightly conical catch apron, as shown in FIGURE 2, is provided. The apron is suitably mounted on bars 152, 154, 156, 158, 160 and 162 on one side and bars 153, 155, 157, 159, 161 and 163 on the other, which incline outwardly and upwardly from their vertical axis pivots 164' affixed to the channels 40 and 42 of the conveyor boom. In order to permit the bars to swing to the retracted position, as shown in FIGURE 3, the panel 164' is detachably secured to the panel 166 by snap fasteners or other suitable means, as indicated at 168.

In order to deflect fruit which may drop in the central region over the shaker mechanism 34, an inverted V like cover plate or roof 170 is provided that is mounted above the supports 114 and 116, as indicated in FIGURE 11 and FIGURE 2. Such plate 170 deflects any fruit dropping thereon to one side or the other onto the apron from which the fruit rolls onto the conveyor belt. It will be understood that the apron has an elongate opening over the conveyor as at 172, and the edges of the flexible material may be attached to the upper flanges 174 and 176 of the channels 40 and 42 as at 178 and 180. The support bars 152–163 may be spring urged to swing to the retracted position as shown in FIGURE 2 by coil springs 184 disposed at the pivot 164', so that by detaching the panels 164 and 166 at the fastening means 168, retraction is automatically effected from the position of the bars as shown in FIGURE 2 to that shown in FIGURE 3.

It will be understood, that with the apron retracted, and the boom lifted off the ground by the cylinder 64, the tractor is readily moved from one tree to the next, into position so as to permit the tree trunk clamp to solidly grip the trunk of the tree. Thereafter by manually swinging the rod 156 counterclockwise and the rod 158 clockwise, from their position as shown in FIGURE 3 to that shown in FIGURE 2, and by coupling the fasteners 168, the apron is completed. Such movement automatically swings the rods 152 and 154 into position, and also rods 153, 155, 157, 159, 161, 163, 162 and 160. As soon as the apparatus is coupled to a tree trunk, power is supplied to the conveyor motor 94 and the shaker drive motor 30. In a matter of seconds, harvest is completed and the fruit is quickly moved up the conveyor and discharged into a box such as 102.

Power for the hydraulic motors and lift cylinders can be supplied by a standard pump and reservoir assembly on the tractor, as indicated at 105, and suitable controls in the form of valves may be provided as desired.

In FIGURES 16 and 17 the shaker mechanism 124 is shown disposed below the conveyor boom, and hung from three chains 200, 202 and 204. Any suitable ground support for the boom may be provided, or it may be held at a suitable height above the ground by the cylinder 64, see FIGURE 4. When so arranged the deflector 170 is unnecessary since the apron is wholly above the shaker. In FIGURES 13 and 14, removable supports 63 and 65 are shown having triangular tongues 67 and 69 sliding into the space above angle iron 48.

Since the time element in moving from tree to tree is important it may be desirable to power actuate the apron from its open spread position to its folded position or vice versa. As shown in FIGURES 18–21 inclusive the rods 256 and 258 may be power actuated. As shown in FIGURES 19 and 20, a cylinder 210 acting on a crank arm 212 serves to actuate the rod 256 against its return spring 184. The rod 258 is rotated by a power cylinder 214 pulling on a chain 216 wrapped around a sprocket 218 affixed to the rod 258, so as to urge the rod to the position shown in FIGURE 18 against its spring 284. In order to obviate the necessity of manually connecting the apron by fastening means such as 168 and previously described, the rods 256 and 258 may be offset as at 257 and 259 so as to closely approach each other in the closed position. By providing the rod 256 with an angle piece 260 adapted to lock into a similar but inverted angle piece 262 on rod 258, and by providing a lifting cam and pin 264 and 266 on rod 256 adjacent the spring 184, the rod 256 can be caused to lift to the position shown in FIGURE 18 as it reaches the position shown to interlock the angle pieces 260 and 262 as shown. Upon slight return rotation the rod 256 drops as the pin 266 rides off the cam 264, and the angle pieces are disengaged. This can be accomplished by reversely powering the cylinder 210 momentarily so as to swing both rods 256 and 258 to the right, as seen in FIGURE 18, until release is effected, whereupon the rod 258 is retracted to its folded position by its spring 284, and rod 256 retracted by its spring 184. Such interlocking means, may if desired, be dispensed with, by merely maintaining the cylinders 214 and 210 under pressure, to hold the rods 256 and 258 against each other, when in the open position during fruit catching.

From the foregoing, it can be seen that the tractor is capable of quickly moving the conveyor boom from tree to tree, and at each tree, the shaker and catcher are quickly affixed and extended. When all is ready the conveyor and shaker are power driven. When a resonance condition occurs the leaves stand up, the cherries drop, and as soon as the conveyor clears the crop, the apron is folded, the shaker detached, and the apparatus proceeds to the next tree.

In practice it may be desirable to employ a conveyor that reaches to a trunk, instead of extending alongside and extending beyond. If such be the case, the apron may be symmetrical and supported on longer bars, two of which can wrap around the trunk and extend to the far side and be adapted for coupling in the manner as indicated in FIGURES 18-21, or be held abutting by maintaining power in the actuating mechanism. It may also be desirable to mount the shaker and its tree trunk grip from one position to a position such as 90 degrees therefrom, so that shaking in one direction can be followed by a brief shaking in a transverse direction. Such direction may be on angles at 45 degrees from either sides of the conveyor.

While a single form of the invention with modifications has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A tree fruit harvesting apparatus comprising an elongated inclined boom including a conveyor adapted to be carried by a tractor at its upper end and reach to the trunk of a fruit tree at the other, and a vibratory tree shaker yieldingly mounted on the boom, means to solidly clamp the shaker to the trunk of a tree bearing on opposite sides of the tree trunk and applying pressure to the opposite sides of the tree along a clamp axis, said shaker being oriented to apply vibratory forces to the tree trunk at an accelerating frequency in the direction of the clamp axis.

2. A harvesting apparatus as set forth in claim 1 wherein the boom and conveyor comprise spaced channel members, having facing webs and flanges extending oppositely.

3. A harvesting apparatus as set forth in claim 2 wherein the facing webs are provided with guides extending midway along the length thereof and a conveyor belt is disposed with the side edges of its upper reach running beneath said guides.

4. A harvesting apparatus as set forth in claim 3 wherein the conveyor is provided with a pair of closely spaced drive rolls driven in opposite directions at its upper end and the upper reach of the conveyor belt is drawn over and around one roll and over the second roll on its return to the lower end.

5. A harvesting apparatus as set forth in claim 1 having a circular thin flexible canopy inclining downwardly toward its center and of a diameter substantially that of a tree mounted on the boom, with its center substantially aligned with the tree trunk shaker clamp.

6. A harvesting apparatus as set forth in claim 5 wherein the circular canopy is divided along a radial line and supported on inclined arms pivotally mounted upon the opposite sides of the boom for rotation about vertical axes whereby said canopy may be folded, and the canopy is divided to discharge onto the conveyor.

7. A harvesting apparatus according to claim 6, wherein the arms on opposite sides of the radial line along which the canopy is divided are power actuated to open and fold the canopy.

8. Fruit harvesting apparatus comprising a boom adapted to extend to a position adjacent the trunk of a fruit tree, a substantially circular thin flexible catching apron having a radially slit extending to the center to permit the sectors of said apron on opposite sides of the slit to receive the trunk of a tree below the foliage thereof substantially at the center of the apron, with the sector underlying substantially all of the foliage of the tree, a plurality of arms having substantially vertical pivots on said boom disposed at spaced points therealong having outwardly and upwardly inclined support sections underlying said apron with their ends secured at spaced points along the outer edge of said apron, an adjacent pair of said arms being disposed on opposite sides of said slit, the arms supporting one of said sectors being rotatable in one direction to fold the sector toward the boom, and the arms supporting the other of said sectors being rotatable in the opposite direction to fold the other sector toward the boom.

9. Apparatus according to claim 8, wherein the boom comprises a conveyor having spaced side walls and to which each sector extends, whereby fruit caught in the apron may gravitate to the conveyor.

10. Apparatus according to claim 8 wherein power actuating means for rotating the arms to fold and unfold the apron is mounted on the boom.

References Cited

UNITED STATES PATENTS

| 2,714,281 | 8/1955  | Steele        | 56—329 |
|-----------|---------|---------------|--------|
| 3,105,346 | 10/1963 | Stonelift     | 56—329 |
| 3,338,040 | 8/1967  | Shipley       | 56—328 |
| 3,407,582 | 10/1968 | Poehlmann     | 56—329 |
| 3,412,539 | 11/1968 | Gilbert et al.| 56—329 |

RUSSELL R. KINSEY, Primary Examiner